United States Patent
Song et al.

(10) Patent No.: US 7,342,383 B1
(45) Date of Patent: Mar. 11, 2008

(54) APPARATUS AND METHOD FOR SMOOTH DCM-TO-CCM TRANSITION IN A MULTI-PHASE DC-DC CONVERTER

(75) Inventors: Chunping Song, Santa Clara, CA (US); Tawen Mei, Mountain View, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 75 days.

(21) Appl. No.: 11/268,387

(22) Filed: Nov. 7, 2005

(51) Int. Cl.
*G05F 1/00* (2006.01)

(52) U.S. Cl. .................. 323/222; 323/282; 363/65

(58) Field of Classification Search ........ 323/282–288, 323/269, 281, 272, 225, 207; 363/40–44, 363/65, 71, 148; 318/798, 801
See application file for complete search history.

(56) References Cited

U.S. PATENT DOCUMENTS

| | | | |
|---|---|---|---|
| 5,731,731 A | 3/1998 | Wilcox et al. | |
| 5,912,552 A | 6/1999 | Tateishi | |
| 6,144,194 A * | 11/2000 | Varga | 323/285 |
| 6,246,222 B1 | 6/2001 | Nilles et al. | |
| 6,346,798 B1 | 2/2002 | Passoni et al. | |
| 6,476,589 B2 | 11/2002 | Umminger et al. | |
| 6,515,457 B1 | 2/2003 | Maniktala | |
| 6,515,460 B1 | 2/2003 | Farrenkopf | |
| 6,674,268 B2 | 1/2004 | Rutter et al. | |
| 6,683,441 B2 | 1/2004 | Schiff et al. | |
| 6,696,821 B2 | 2/2004 | Haraguchi et al. | |
| 6,909,619 B2 | 6/2005 | Saeki et al. | |
| 7,045,992 B1 | 5/2006 | Silva et al. | |

OTHER PUBLICATIONS

Abu-Qauhouq, J. et al. (2002) "Novel Control Method for Multiphase Low-Voltage High-Current Fast-Transient VRMs," *IEEE*, pp. 1576-1581.
Saito, T. et al. (2003) "WTA-Based Interleaved Buck Converters for Low-Voltage High-Current Applications," *IEEE*, pp. 652-655.
Abu-Qahouq, J. et al. (2004) "Multiphase Voltage-Mode Hysteretic Controlled DC-DC Convertor with Novel Current Sharing," *IEEE Transactions on Power Electronics*, 19(6):1397-1407.

(Continued)

*Primary Examiner*—Rajnikant B. Patel
(74) *Attorney, Agent, or Firm*—Darby & Darby P.C.; Matthew M. Gaffney

(57) ABSTRACT

A multi-phase regulator that provides a smooth transition between DCM and CCM by employing partially synchronous rectification in which a duty cycle of a synchronous switch enable signal is gradually increased to 100%. The regulator includes a separate inductor, high-side switch, and synchronous switch for each phase. The high-side switches are controlled based on a separate PWM signal for each phase. Each PWM signal is provided by pulse width modulating the error signal, with each of the PWM signals having a different phase. During the partially synchronous rectification, the synchronous switch turns on when the high-side switch is off and the synchronous switch enable signal is asserted, and the synchronous switch is off otherwise. The synchronous switch enable signal has a frequency relative to the frequency of each of the pulse width modulation output signal such that good current sharing among the inductors of each phase is achieved.

20 Claims, 7 Drawing Sheets

OTHER PUBLICATIONS

National Semiconductor Datasheet (2004) "LM27263 2/3/4-Phase Voltage Regulator Controller," pp. 1-24, National Semiconductor Corporation, Santa Clara, California.

LTC1873 Datasheet: Dual 550kHz Synchronous 2-Phase Switching Regulator Controller with 5-bit VID, Linear Technology Corporation, 1630 McCarthy Blvd., Milpitas, CA 95035-7417, pp. 1-32, 1999.

LTC3406 Datasheet: 1.5MHz, 600mA Synchronous Step-Down Regulator in ThinSOT, Linear Technology Corporation, 1630 McCarthy Blvd., Milpitas, CA 65035-7417, pp. 1-16, 2002.

MAX1684/MAX1685 Datasheet: Low-Noise, 14V Input, 1A, PWM Step-Down Converters, Maxim Integrated Products, 120 San Gabriel Drive, Sunnyvale, CA 94086, pp. 1-14, 2001.

* cited by examiner

APPARATUS AND METHOD FOR SMOOTH DCM-TO-CCM TRANSITION IN A MULTI-PHASE DC-DC CONVERTER

FIELD OF THE INVENTION

The invention is related to switching voltage regulators, and in particular, to an apparatus and method for a gradual transition from asynchronous to synchronous rectification in a multi-phase regulator with current balance among the inductors.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which.

DETAILED DESCRIPTION

Figure 1:
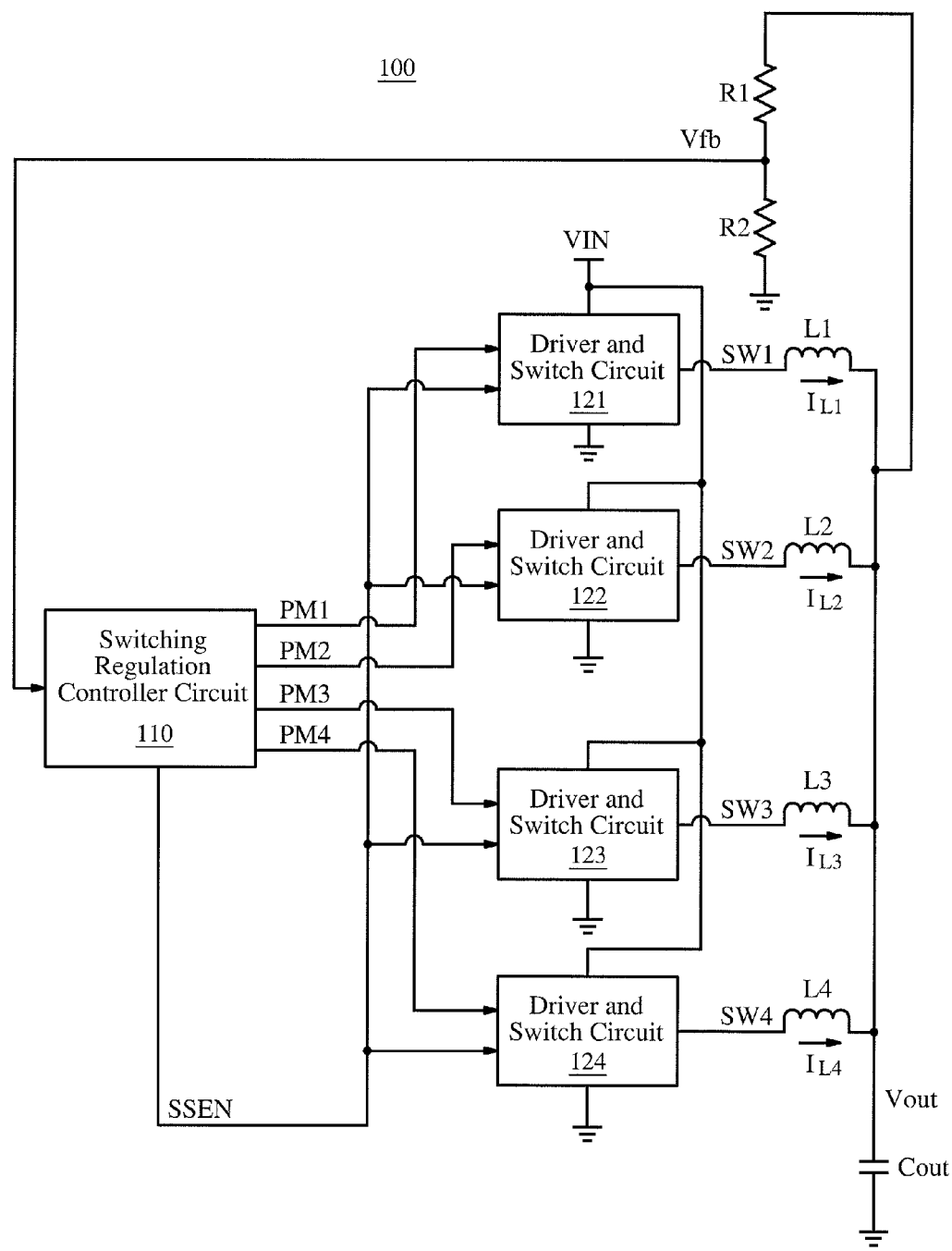
FIG. 1 shows a block diagram of an embodiment of a multi-phase switching regulator circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a multi-phase regulator that provides a smooth transition between DCM and CCM by employing partially synchronous rectification in which a duty cycle of a synchronous switch enable signal is gradually increased to 100%. The regulator includes a separate inductor, high-side switch, and synchronous switch for each phase. The high-side switches are controlled based on a separate PWM signal for each phase. Each PWM signal is provided by pulse width modulating the error signal, with each of the PWM signals having a different phase. During the partially synchronous rectification, the synchronous switch turns on when the high-side switch is off and the synchronous switch enable signal is asserted, and the synchronous switch is off otherwise. The synchronous switch enable signal has a frequency relative to the frequency of each of the pulse width modulation output signal such that good current sharing among the inductors of each phase is achieved.

FIG. 1 shows a block diagram of an embodiment of multi-phase switching regulator circuit 100. Multi-phase switching regulator circuit 100 is operable to provide regulated output voltage Vout employing multiple phases. Although multi-phase switching regulator circuit 100 shows a circuit with four phases, in other embodiments, a number of phases other four may be employed. In general, multi-phase switching regulator circuit 100 is an n-phase switching regulator circuit, where n may be any integer greater than one. Multi-phase switching regulator circuit 100 may include switching regulation controller circuit 110, resistors R1 and R2, n driver and switch circuits 121-12n (e.g. driver and switch circuits 121-124), n inductors L1-Ln (e.g. inductors L1-L4), and output capacitor Cout.

In operation, resistors R1 and R2 operate as a voltage divider to provide feedback voltage Vfb from voltage Vout. Also, switching regulation controller circuit 110 is operable to provide pulse modulation output signals PM1-PMn and synchronous switch enable signal SSEN. Switching regulation controller circuit 110 is operable to provide each of the pulse modulation signals PM1-PMn by modulating a parameter of the pulse modulation signal based, in part, on feedback voltage Vfb. In one embodiment, the duty cycle of each of the signals PM1-PMn is the modulated parameter. Switching regulation controller circuit 110 is operable to provide synchronous switch enable signal SSEN to control each of the synchronous switches (not shown in FIG. 1) within each of the driver and switch circuits 121-12n.

Embodiments of synchronous regulation controller circuit 110 are described in greater detail below with regard to FIG. 4 and FIG. 6.

In one embodiment, driver and switch circuit 121 is operable to selectively couple inductor L1 to either VIN, ground, or a high impedance based on signals PM1 and SSEN. Inductor L1 is operable to provide inductor current $I_{L1}$. Each of the other phases is arranged to operate in a substantially similar manner as the first phase. For example, for the second phase, driver and switch circuit 122 may be operable to selectively couple inductor L2 to either VIN, ground, or a high impedance based on signals PM2 and SSEN, and inductor L2 is operable to provide inductor current $I_{L2}$. Output capacitor Cout is operable to provide output voltage Vout based on the combined inductor currents $I_{L1}$-$I_{Ln}$ from each of the phases.

In one embodiment, switching regulation controller circuit 110 is included on one integrated circuit, and driver and switch circuit 121-12n are included on another integrated circuit. In this embodiment, switching regulation controller circuit 110 only requires only one pin to provide signal SSEN to each of the driver and switch circuits 121-12n. This is preferable to requiring a separate SSEN signal to each of the driver and switch circuit 121-12n, which would require n pins for the synchronous switch enable signals rather than only one.

Figure 2:
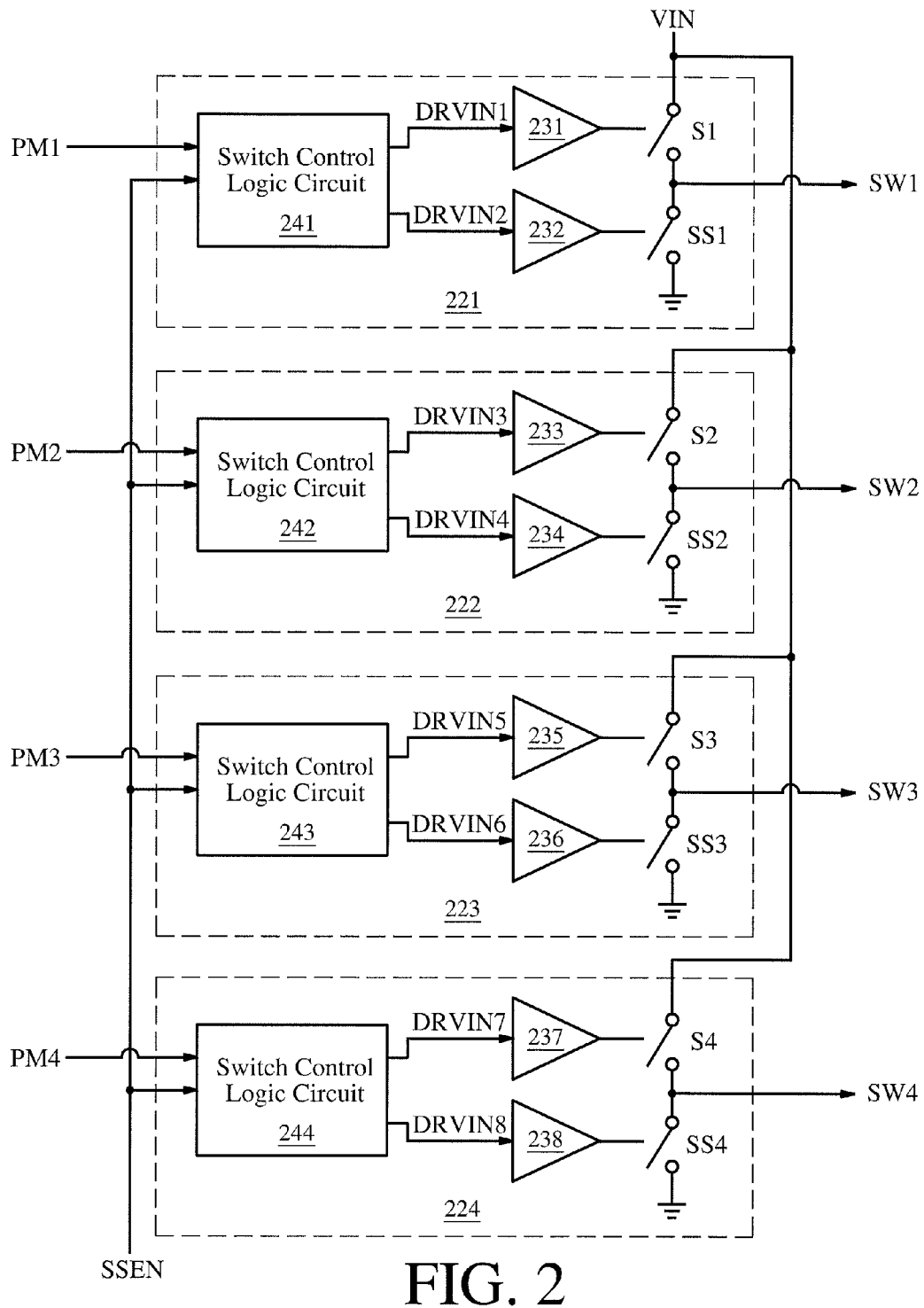
FIG. 2 illustrates a block diagram of an embodiment of the driver and switch circuits of FIG. 1.

FIG. 2 illustrates a block diagram of an embodiment of driver and switch circuits 221-22n (e.g. 221-224), which may be employed as embodiments of driver and switch circuits 121-12n (e.g. 121-124) of FIG. 1. Although four phases are illustrated in FIG. 2, as previously discussed, a number of phases other than four may be employed within the scope and spirit of the invention. Driver and switch circuit 221 includes switch control logic circuit 241, drivers 231 and 232, switch S1, and synchronous switch SS1. The other driver and switch circuits may be the same or substantially similar to driver and switch circuit 221.

Driver 231 is operable to drive switch S1 based on driver input signal DRVIN1, and driver 232 is operable to drive synchronous switch SS1 based on driver input signal DRVIN2. Switch S1 is operable to close if signal DRVIN1 is asserted and to open if signal DRVIN1 is unasserted. Similarly, synchronous switch SS1 is operable to close if signal DRVIN2 is asserted and to open if signal DRVIN2 is unasserted.

In one embodiment, signal DRVIN1 is signal PM1. In another embodiment, in which the logic is reversed, switch control logic 241 is operable to provide signal DRVIN1 by inverting signal PM1. Also, in some embodiments, a protection scheme or the like within switch control logic circuit 241 may further modify signal DRVIN1 relative to signal PM1.

Further, switch control logic circuit 241 is operable to provide signal DRVIN2 such that signal DRVIN2 is asserted if two conditions are met: signal DRVIN1 is unasserted, and synchronous switch enable signal SSEN is asserted. A break-before-make scheme may be employed to ensure that switch S1 and synchronous switch SS1 are not simultaneously closed.

In one embodiment, if switch S1 is closed, SW1 is coupled to VIN. If synchronous switch SS1 is closed, SW1 is coupled to ground. Also, in this embodiment, if switch S1 and synchronous switch SS1 are both open, SW is coupled to a high impedance node.

The other phases may operate in the same or a substantially similar manner as described above with regard to the first phase.

Although a buck regulator architecture is illustrated in FIG. 2, in other embodiments, a boost regulator architecture, a buck-boost architecture, or the like, may be employed instead. These variations and others are within the scope and spirit of the invention.

Figure 3:
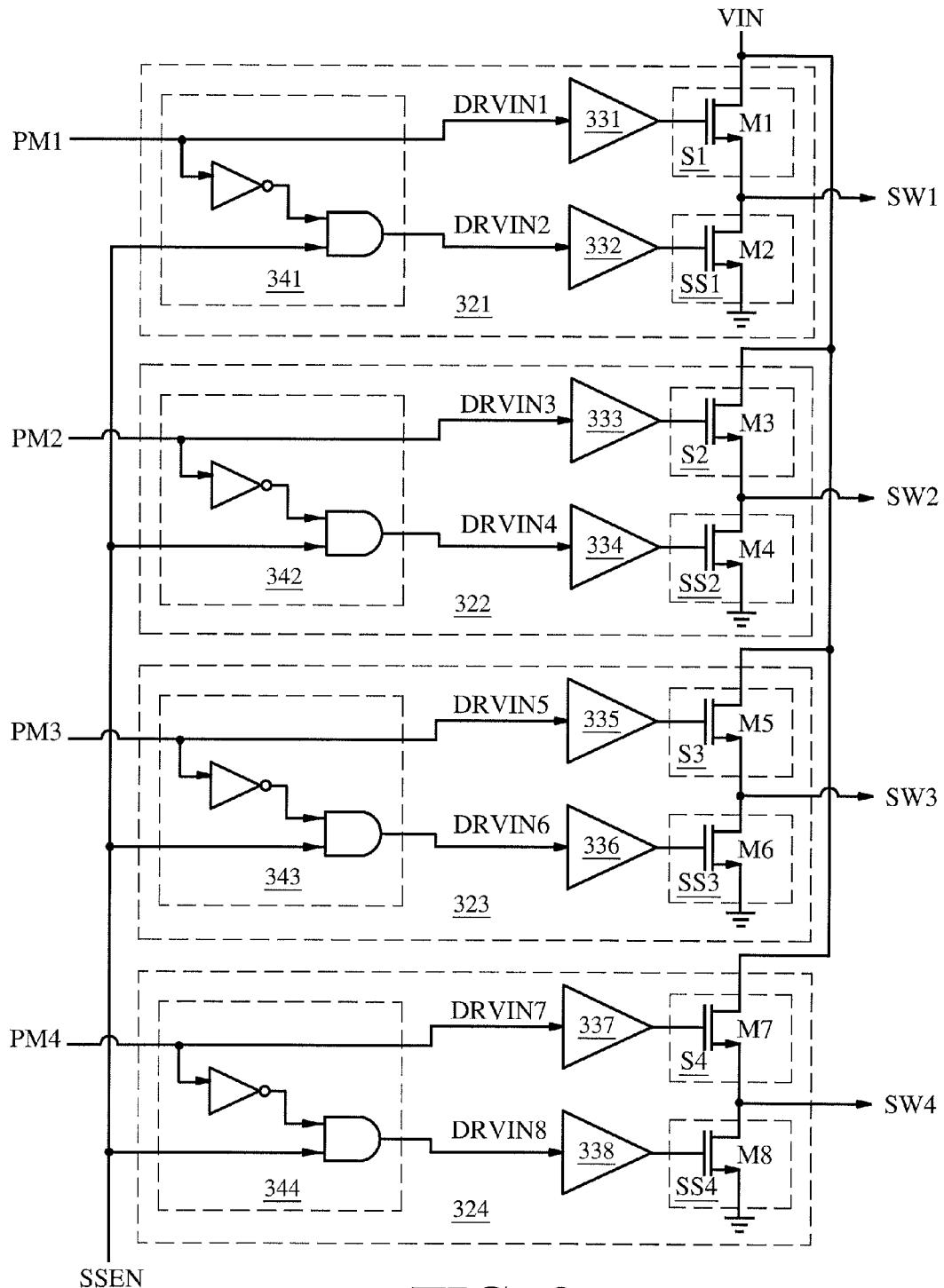
FIG. 3 shows a block diagram of an embodiment of the driver and switch circuits of FIG. 2.

FIG. 3 shows a block diagram of an embodiment of driver and switch circuits (e.g. 321-324) which may be employed as embodiments of the driver and switch circuits (e.g. 221-224) of FIG. 2.

Figure 4:
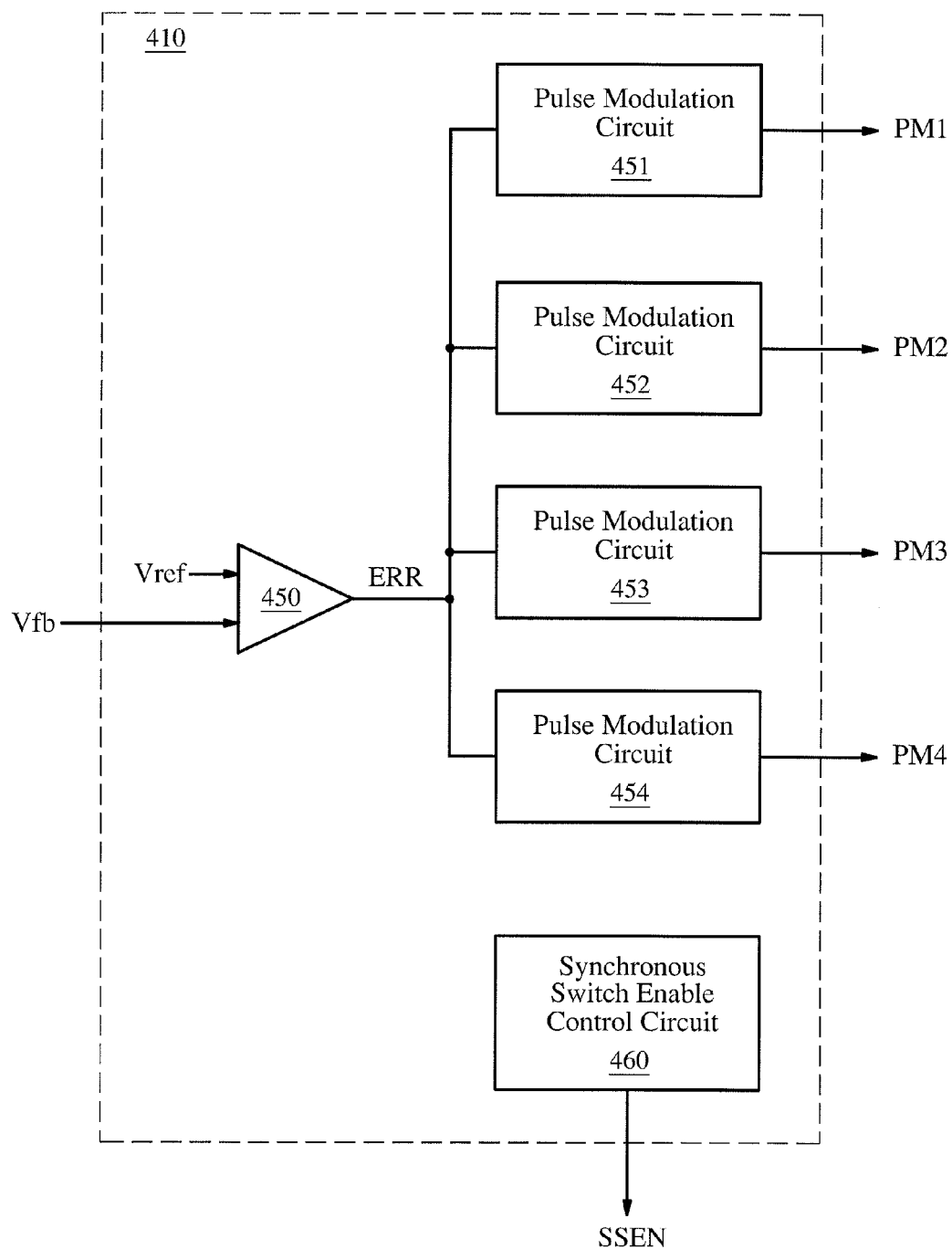
FIG. 4 illustrates a block diagram of an embodiment of the switching regulation controller circuit of FIG. 1.

FIG. 4 illustrates a block diagram of an embodiment of switching regulation controller circuit 410, which may be employed as an embodiment of switching regulator circuit 110 of FIG. 1. Switching regulation controller circuit 410 includes pulse modulation circuits 451-45n, error amplifier 450, and synchronous switch enable control circuit 460.

In operation, error amplifier 450 provides error signal ERR based on reference voltage Vref and feedback voltage Vfb. Also, synchronous switch enable control circuit 460 is operable to provide synchronous switch enable signal SSEN.

Each of the pulse modulation circuits 451-45n is operable to provide a corresponding pulse modulation output signal PM1-PMn (e.g. PM1-PM4). Each of the pulse modulation signals are substantially the same signal except for a phase difference between the signals. In one embodiment, the phase differences of signals PM1-PM4 are equally spaced apart to span the full period of the signal. For example, in one embodiment, signal PM2 lags signal PM1 by TPM/4, signal PM3 lags signal PM1 by TPM/2, and signal PM4 lags signal PM1 by 3TPM/4, where TPM represents the period of each of the signals PM1-PM4.

In one embodiment, switching regulation controller circuit 410 is operable to control driver and switch circuits 221-22n of FIG. 2 as follows. The switching regulation may start up in asynchronous rectification by providing signal SSEN at an unasserted level. Switching regulation may be started with asynchronous rectification, for example, to start up the circuit at a pre-biased output voltage condition without discharging the output capacitor during startup. A soft-start is employed by gradually increasing Vref to its final value during the asynchronous rectification. When the start-soft ends, or shortly thereafter, the rectification is changed from asynchronous rectification to partially synchronous rectification. This is accomplished by gradually increasing a parameter of signal SSEN. In one embodiment, the duty cycle of signal SSEN is gradually increased until the duty cycle of signal SSEN reaches 100% duty cycle. Once the duty cycle of signal SSEN reaches 100%, the switching regulation is thereby operating in synchronous rectification rather than partially synchronous rectification.

When synchronous rectification is being performed, each of the inductor currents $I_{L1}$-$I_{Ln}$ is operating in continuous conduction mode (CCM). While asynchronous rectification is being performed, each inductor current $I_{L1}$-$I_{Ln}$ may be operating in discontinuous conduction mode (DCM). In this case, the transition from asynchronous rectification to synchronous rectification causes a transition of each of the inductor currents $I_{L1}$-$I_{Ln}$ from DCM to CCM. However, if the inductor current does not reach zero during asynchronous rectification, then the inductor current is operating in CCM.

For any given duty cycle of signal PWM1, voltage gain Vout/VIN may be different for DCM than it is for CCM. Also, for any given duty cycle, the voltage gain may be different for asynchronous rectification than is for synchronous rectification, even if the inductor current is in CCM for both the asynchronous and synchronous rectification. By employing a gradual transition from asynchronous rectification to synchronous rectification, a voltage glitch or transient response may be prevented. The transition from asynchronous rectification to synchronous rectification is preferably performed in a sufficiently gradual manner that the closed loop control can compensate for the difference between voltage gain in asynchronous rectification and voltage gain in synchronous rectification.

Synchronous switch enable circuit 440 is operable to provide signal SSEN such that, for each of the pulse modulation signals (PM1-PMn): the pulse modulation signal and signal SSEN are asserted at the same time at least once during the first half of the partially synchronous rectification. For example, for a four-phase embodiment, during the first half of the partially synchronous rectification, signal PM1 and signal SSEN are both asserted at the same time at least once, signal PM2 and signal SSEN are both asserted at the same time at least once, signal PM3 and signal SSEN are both asserted at the same time at least once, and signal PM4 and signal SSEN are both asserted at the same time at least once.

In one embodiment, the amount of time that signal SSEN is asserted simultaneously with each of the signals PM1-PMn are all roughly the same for each of the signals PM1-PMn so that the inductor currents for each phase (e.g. currents $I_{L1}$-$I_{L4}$) are approximately balanced with respect to each other.

Figure 5:
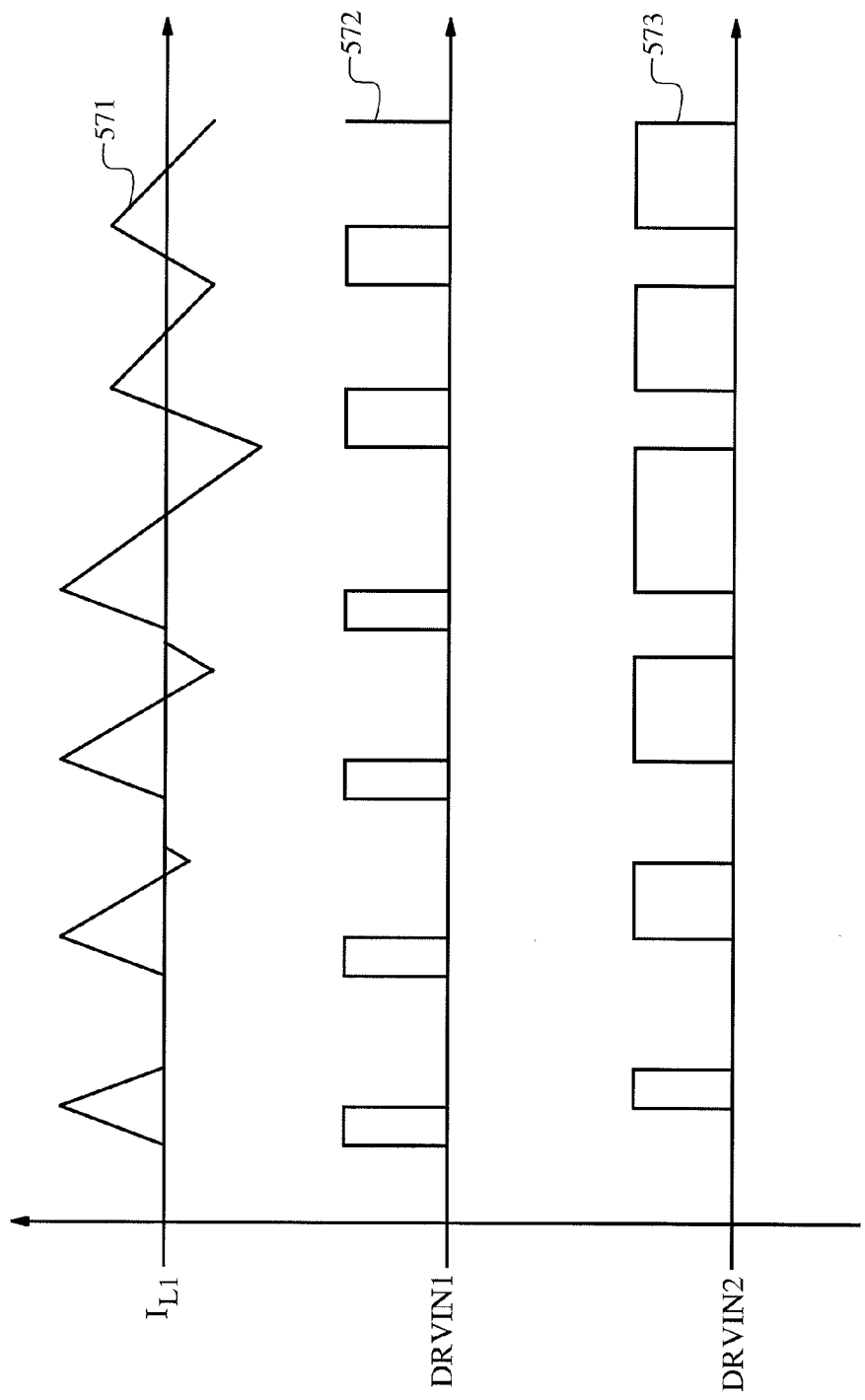
FIG. 5 shows a timing diagram of waveforms of embodiments of signals for an embodiment the multi-phase switching regulator circuit of FIG. 1.

FIG. 5 shows a timing diagram of waveforms 571, 572, and 573 of embodiments of current $I_{L1}$, signal DRVIN1, and signal DRVIN2, respectively.

For the embodiment illustrated in FIG. 5, inductor current $I_{L1}$ operates in DCM during asynchronous rectification, and operates in CCM during synchronous rectification. During the gradual transition from asynchronous rectification to synchronous rectification, current $I_{L1}$ gradually transitions from DCM to CCM.

As shown by waveform 571, current $I_{L1}$ ramps upward when switch S1 turns on. In the embodiment shown in FIG. 5, as shown by waveform 572, this occurs in response to a pulse in signal DRVIN1. Current $I_{L1}$ then ramps downward when switch S1 turns off. Current $I_{L1}$ does not go below zero unless synchronous switch SS1 is turned on, where synchronous switch SS1 is turned on if signal DRVIN2 is high. If signal DRVIN2 changes from high to low and current $I_{L1}$ is below zero, current $I_{L1}$ ramp upwards until it reaches zero.

As shown by waveform 573, the pulse width of signal DRVIN2 is gradually increased during the transition to synchronous rectification, until synchronous rectification is reached.

Due to the gradual increase, during the transition from DCM to CCM, for each period of the inductor current, the pulse width of signal SSEN is gradually increased during each successive clock period. The duty cycle increases between a first period of current $I_{L1}$ and the period that occurs after the first period of current $I_{L1}$, and increases further still on the period of current $I_{L1}$ after that. FIG. 5 shows an increase that occurs over a small number of clock cycles for illustrative purposes. However, preferably, as discussed above, the increase in pulse width of signal DRVIN2 is sufficiently gradual that the closed loop control can compensate for the difference between voltage gain in DCM and voltage gain in CCM. The gradual increase may occur over on the order of 1000 periods of current $I_{L1}$.

Figure 6:
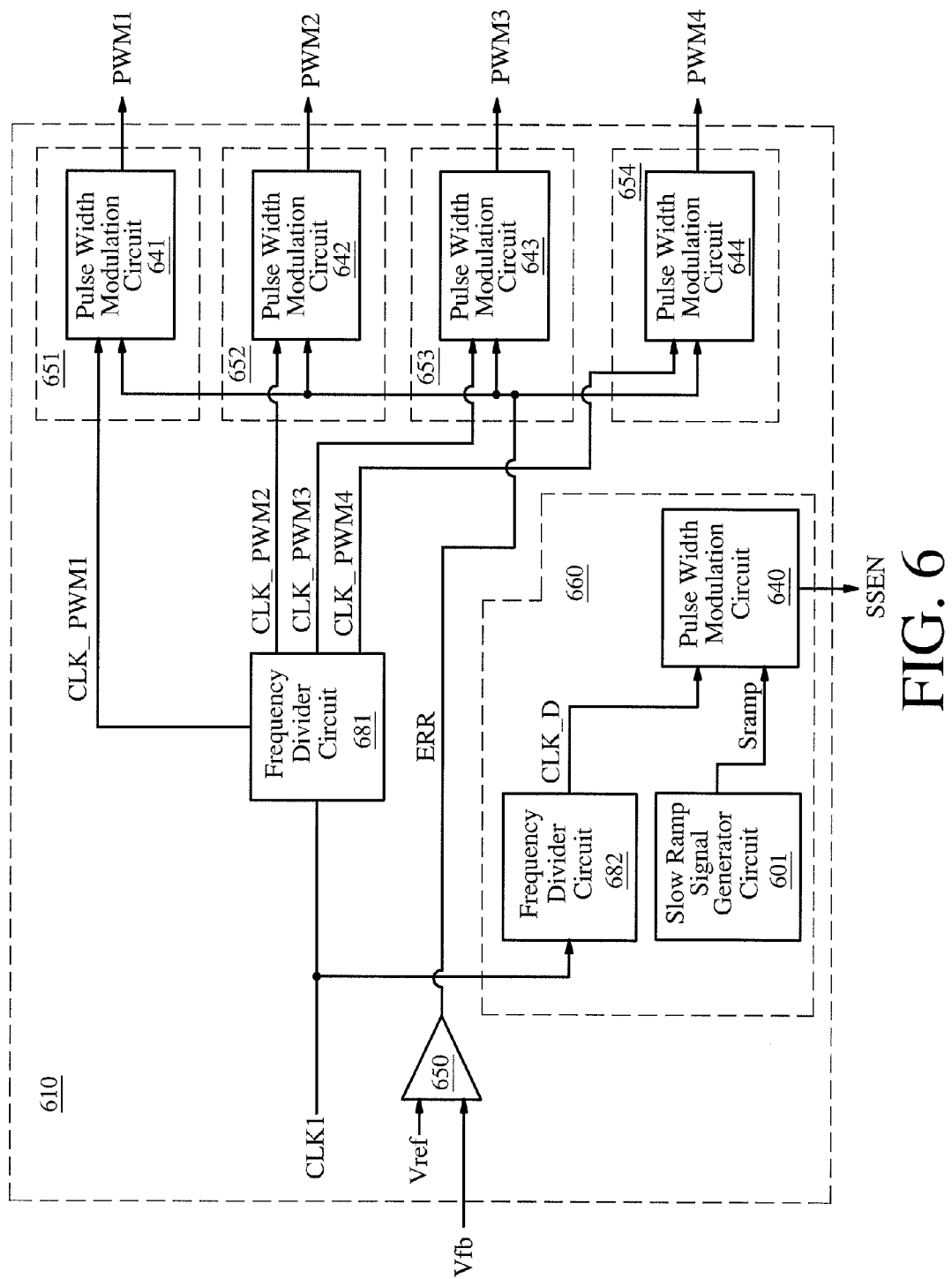
FIG. 6 shows a block diagram of an embodiment of the switching regulation controller circuit of FIG. 4.

FIG. 6 shows a block diagram of an embodiment of switching regulation controller circuit 610, which may be employed as an embodiment of switching regulator controller circuit 410 of FIG. 4. Switching regulator controller circuit 610 may further include frequency divider circuit 681. Each of the pulse modulation circuits 651-65n includes a corresponding pulse width modulation circuit 641-64n, respectively. Synchronous switch enable circuit 660 may include frequency divider circuit 682, slow ramp signal generator circuit 601, and pulse width modulation circuit 640. Pulse width modulation signals PWM1-PWMn are embodiments of pulse modulation signals PM1-PMn.

In operation, frequency divider circuit 681 may provide clock signals CLK_PWM1-CLK_PWMn from clock signal CLK1, and frequency divider circuit 682 may provide clock signal CLK_D from clock signal CLK1. In one embodiment, signals CLK_PWM1-CLK_PWMn each have the same frequency, but have different phases, and clock signals CLK_PWM1-CLK_PWNn have approximately equally spaced phase differences spanning one period of signal CLK_PWM1.

In one embodiment, frequency divider circuit 682 is operable to provide signal CLK_D such that FCLK_D=FCLK1/N, where FCLK1 represents the frequency of signal CLK1, FCLK_D represents the frequency of signal CLK_D, N=k*n, n represents the number of phases, and k represents a pre-determined integer that is greater than zero. Also, in this embodiment, frequency divider 681 is operable to provide signals CLK_PWM1-CLK_PWMn such that FCLK2=FCLK1/F, where FCLK2 represents the frequency of signal CLK_PWM1, and where F is a pre-determined integer that satisfies the following condition: F and N are relatively prime.

Slow ramp signal generator circuit 601 may provide slow ramp signal Sramp.

Each of the pulse width modulation circuits 640 and 641-64n is operable to pulse width modulate the corresponding input signal (signal Sramp for pulse width modulation circuit 640 and error signal ERR for pulse width modulation circuit 641-64n), to provide a signal (signal SSEN for pulse width modulation circuit 640, signals PM1-PMn respectively for pulse width modulation circuits 641-64n, respectively). Each of the pulse width modulation circuits provides the signal with a frequency equal to the input clock signal received; however, the duty signal of the signal is modulated based on the corresponding input signal.

Switching regulation controller circuit 610 is operable to provide signal SSEN with a frequency such that the inductors currents for each phase (e.g. currents $I_{L1}$-$I_{Ln}$) are approximately balanced with respect to each other. In one embodiment, this is accomplished by employing frequency divider circuit 681 and 682, with F and N being relatively prime, as describe above. In other embodiments, providing signal SSEN with a frequency such that the inductor currents are approximately balanced is accomplished in a different manner.

In some embodiments, frequency divider circuits 681 and 682 are included in controller circuit 610. In other embodiments, frequency dividers circuit 681 and 682 are not included. Instead, two different oscillators are employed to provide clock signals CLK_PWM1 and CLK_D. In one embodiment, signals CLK_PWM1 and CLK_D are provided such that the ratio R is an irrational number, where R represents FPWM/FSSEN, FPWM represents the frequency of signal PM1, and FSSEN represents the frequency of signal SSEN. In this embodiment, current balance among the inductors may be approximately maintained due to the irrationality of ratio R. Since frequency is the reciprocal of period, R is also equal to TSSEN/TPWM, where TSSEN represents the period of signal SSEN and TPWM represents the period of signal PWM1.

In another embodiment, the ratio R is a rational number, and F and N are relatively prime, where F represents R*N, and N represents k*n, and k represents the smallest positive integer for which F is an integer. In one embodiment, signal SSEN is provided so that N=n and F=N+1. In this way, F and N are relatively prime. For example, in one four-phase embodiment, N=n=4, and F=N+1=5, so that F and N are relatively prime. As another example, in one five-phase embodiment, N=n=5, and F=N+1=6, so that F and N are relatively prime.

In another embodiment, R is a rational number, F and N are not relatively prime, and F and N are both large numbers (e.g. both at least twenty).

FIG. 6 illustrates an embodiment in which synchronous switch enable circuit 660 generates synchronous switch enable signal SSEN by pulse width modulating a slow ramp signal. However, in other embodiments, the synchronous switch enable circuit 660 may provide signal SSEN in a different manner, such as by generating signal SSEN digitally, in software, or the like. These variations and others are within the scope and spirit of the invention.

Figure 7:
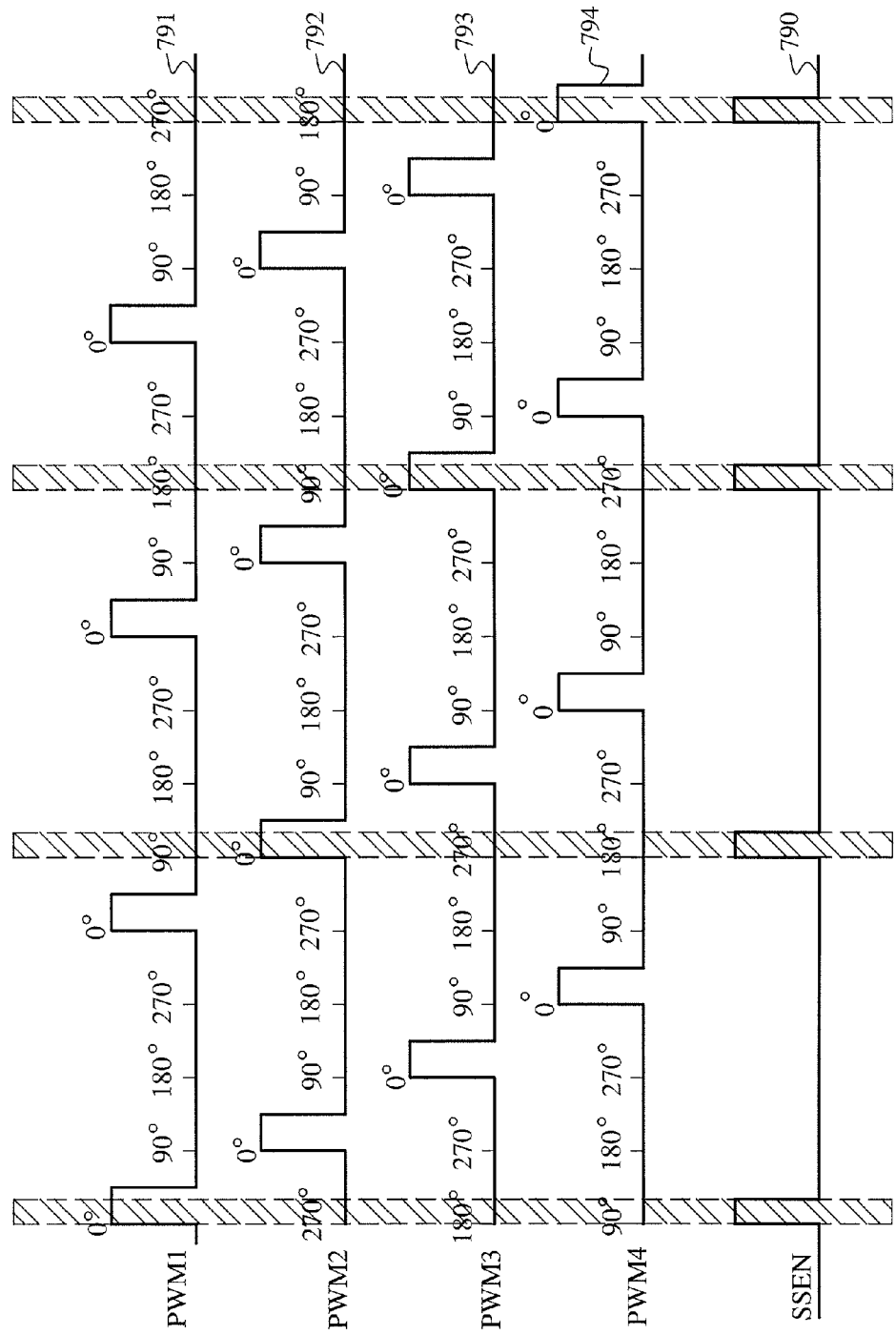
FIG. 7 illustrates a timing diagram of waveforms of embodiments of signals from the switching regulator controller circuit of FIG. 5, in accordance with aspects of the invention.

FIG. 7 illustrates a timing diagram of waveforms of embodiments of signals 790-794 of embodiments of signals SSEN and PWM1-PWM4 respectively of an embodiment of switching regulator controller circuit 610 of FIG. 6.

FIG. 7 illustrates a four-phase embodiment in which N=4 and F=5. FIG. 7 shows embodiments of waveforms 790-794 of signals SSEN, PWM1, PWM2, PWM3, and PWM4, respectively, for an embodiment of switching regulator controller circuit 610 of FIG. 6.

When the period of SSEN is relatively prime to that of the PWM signals, the phase angles relative to each PWM signal, in which SSEN is generated, are equal, so that good current sharing among different phases can be kept.

In the embodiment illustrated in FIG. 7, relative to PWM1, SSEN is generated at 0°, 90°, 180°, and 270°. Relative to PWM2, SSEN is generated at 270°, 0°, 90°, and 180°. Relative to PWM3, SSEN is generated at 180°, 270°, 0°, and 90°. Relative to PWM4, SSEN is generated at 90°, 180°, 270°, and 0°. The phase angles relative to each of the PWM signals in which SSEN is generated are equal in this case; therefore, the inductor currents are symmetrical and equal on average over 4 PWM periods. FIG. 7 shows this concept with the period of SSEN as (5/4)*TPWM.

An example in which the phase angles relative to each PWM signals in which SSEN is generated are not equal would be: let the number of phases be four, let the period of PWM be 4, and the period of SSEN be 6. In this example, F=6 and N=4. Relative to PWM1, SSEN is generated at 0°, and 180°. Relative to PWM2, SSEN is generated at 270° and 90°. Relative to PWM3, SSEN is generated at 180°, and 0°. Relative to PWM4, SSEN is generated at 90°, and 270°. In this example, the phase angles relative to each of the PWM signals in which SSEN is generated are not equal, and therefore the inductor currents are not symmetrical and will not be balanced, because the introduction of SSEN affects each phase differently.

Similarly, if the period of signal SSEN were equal to the period of the PWM signals, and signal SSEN were synchronized with signal PWM1, current balance would not be maintained.

FIG. 7 illustrates an embodiment in which F and N are relatively prime in order to ensure approximate inductor current balance. However, current balance may be accomplished in a different manner in other embodiments. In the case that the ratio of F/N is irrational, the current balance may still be maintained, as in this case SSEN appears at all phase angles of each PWM signals. Furthermore, there are phase angles in which the generation of SSEN do not affect the inductor current dramatically, and therefore still maintain current balance reasonably well. One such case is when the ratio of F/N is expressed as the quotient of two large integers. In this case, the system performance approaches that when PWM and SSEN are irrational.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for multi-phase switching regulation, comprising:
   an error amplifier that is arranged to provide an error signal that is based, in part, on a difference between a feedback signal and a reference signal, wherein the feedback signal is based, at least in part, on an output voltage;
   a plurality of pulse modulation circuits operable to provide a plurality of pulse modulation output signals, wherein each of the pulse modulation circuits is operable to provide a corresponding one of the pulse modulation output signals of the plurality of pulse modulation circuits;
   a synchronous switch enable circuit that is arranged to provide a synchronous switch enable signal such that, during a partially synchronous rectification, a modulation parameter of the synchronous switch enable signal is gradually increased; and such that, for each of the plurality of pulse modulation output signals: the pulse modulation output signal and the synchronous switch enable signal are asserted at the same time at least once during the first half of the partially synchronous rectification; and
   a synchronous switch control circuit that is operable to provide a synchronous switch control signal such that:
      if a first switch control signal is unasserted and the synchronous switch enable signal is asserted
         the synchronous switch control signal is asserted;
      else
         the synchronous switch control signal is unasserted,
   wherein the first switch control signal is based, at least in part, on a first pulse modulation output signal of the plurality of pulse modulation output signals.

2. The circuit of claim 1, wherein the synchronous switch enable circuit is arranged to gradually increase the modulation parameter of the synchronous switch enable signal such that, for three periods of a first of the plurality of pulse modulation output signals during the partially synchronous rectification, the modulation parameter increases between a first period of the first pulse modulation output signal and a second of the three periods of the first pulse modulation output signal, and further increases between the second of the three periods of the first pulse modulation output signal and a third of the three periods of the first pulse modulation output signal.

3. The circuit of claim 1, further comprising:
   a plurality of driver and switch circuits, wherein each of the plurality of driver and switch circuits is coupled to a corresponding one of the plurality of pulse modulation circuits, and wherein each of the plurality of driver and switch circuits includes:
      a synchronous switch control circuit that is operable to provide a synchronous switch control signal based, in part, on the synchronous switch enable signal and the first switch control signal;
a first switch that is arranged to close if a first switch control signal as asserted, and to open if the first switch control signal is unasserted, wherein the first switch control signal is based on the corresponding pulse modulation output signal; and
a synchronous switch that is arranged to close if the synchronous switch control signal is asserted and to open if the synchronous switch control signal is unasserted.

4. A circuit for multi-phase switching regulation, comprising:
an error amplifier that is arranged to provide an error signal that is based, in part, on a difference between a feedback signal and a reference signal, wherein the feedback signal is based, at least in part, on an output voltage;
a plurality of pulse modulation circuits operable to provide a plurality of pulse modulation output signals, wherein each of the pulse modulation circuits is operable to provide a corresponding one of the pulse modulation output signals of the plurality of pulse modulation circuits;
a synchronous switch enable circuit that is arranged to provide a synchronous switch enable signal such that, during a partially synchronous rectification, a modulation parameter of the synchronous switch enable signal is gradually increased; and such that, for each of the plurality of pulse modulation output signals: the pulse modulation output signal and the synchronous switch enable signal are asserted at the same time at least once during the first half of the partially synchronous rectification, and
a plurality of driver and switch circuits, wherein each of the plurality of driver and switch circuits is coupled to a corresponding one of the plurality of pulse modulation circuits, and wherein each of the plurality of driver and switch circuits includes:
a synchronous switch control circuit that is operable to provide a synchronous switch control signal based, in part, on the synchronous switch enable signal and a first switch control signal;
a first switch that is arranged to close if the first switch control signal as asserted, and to open if the first switch control signal is unasserted, wherein the first switch control signal is based on the corresponding pulse modulation output signal; and
a synchronous switch that is arranged to close if the synchronous switch control signal is asserted and to open if the synchronous switch control signal is unasserted, wherein each of the plurality of driver switch circuits further includes:
a driver circuit having at least an input and an output, wherein the driver circuit is operable to receive the corresponding pulse modulation output signal at the input of the driver circuit, and to provide the first switch control signal at the output of the driver circuit; and wherein the synchronous switch circuit is arranged to provide the synchronous control signal such that:
if the first switch control signal is unasserted and the synchronous switch enable signal is asserted
the synchronous switch control signal is asserted;
else
the synchronous switch control signal is unasserted.

5. A circuit for multi-phase switching regulation, comprising:
an error amplifier that is arranged to provide an error signal that is based, in part, on a difference between a feedback signal and a reference signal, wherein the feedback signal is based, at least in part, on an output voltage;
a plurality of pulse modulation circuits operable to provide a plurality of pulse modulation output signals, wherein each of the pulse modulation circuits is operable to provide a corresponding one of the pulse modulation output signals of the plurality of pulse modulation circuits; and
a synchronous switch enable circuit that is arranged to provide a synchronous switch enable signal such that, during a partially synchronous rectification, a modulation parameter of the synchronous switch enable signal is gradually increased; and such that, for each of the plurality of pulse modulation output signals: the pulse modulation output signal and the synchronous switch enable signal are asserted at the same time at least once during the first half of the partially synchronous rectification, wherein each of the plurality of pulse modulation circuits is arranged to provide the corresponding pulse modulation output signal such that the pulse modulation output signal has a first frequency.

6. The circuit of claim 5, wherein each of the plurality of pulse modulation circuits is a pulse width modulation circuit, the plurality of pulse modulation output signals are provided such that the plurality of pulse modulation output signals have relatively uniformly distributed phase differences relative to each other, and wherein the modulated parameter is the duty cycle of the synchronous switch enable signal.

7. The circuit of claim 5, wherein the synchronous switch enable circuit is operable to provide the synchronous switch enable signal such that the synchronous switch enable has a second frequency and such that a ratio of the second frequency to the first frequency is substantially equal to an irrational number.

8. The circuit of claim 5, wherein the synchronous switch enable circuit is operable to provide the synchronous switch enable signal such that the synchronous switch enable has a second frequency, and such that the ratio of the second frequency to the first frequency is rational and F and N are relatively prime, where F represents r*N, r represents FPWM/FSSEN, FPWM represents the first frequency, FSSEN represents the second frequency, F represents r*N, N represents k*n, and where k represents the smallest natural number for which F is an integer.

9. The circuit of claim 5, wherein the synchronous switch enable circuit is operable to provide the synchronous switch enable signal such that the synchronous switch enable has a second frequency, and such that F and N are both greater than nineteen, where F represents r*N, r represents FPWM/FSSEN, FPWM represents the first frequency, FSSEN represents the second frequency, F represents r*N, N represents k*n, and where k represents the smallest natural number for which F is an integer.

10. A circuit for multi-phase switching regulation, comprising:
an error amplifier that is arranged to provide an error signal that is based, in part, on a difference between a feedback signal and a reference signal, wherein the feedback signal is based, at least in part, on an output voltage;
a plurality of pulse modulation circuits operable to provide a plurality of pulse modulation output signals, wherein each of the pulse modulation circuits is operable to provide a corresponding one of the pulse modulation output signals of the plurality of pulse modulation circuits; and a synchronous switch enable circuit that is arranged to provide a synchronous switch enable signal such that, during a partially synchronous rectification, a modulation parameter of the synchronous switch enable signal is gradually increased; and such that, for each of the plurality of pulse modulation output signals: the pulse modulation output signal and the synchronous switch enable signal are asserted at the same time at least once during the first half of the partially synchronous rectification, wherein each of the plurality of pulse modulation circuits is a pulse width modulation circuit, and wherein the modulation parameter is the duty cycle of the synchronous switch enable signal.

11. The circuit of claim 10, further comprising:

an oscillator circuit having at least an output, wherein each of the plurality of pulse width modulation circuits includes a clock input, and wherein the synchronous switch enable circuit includes a clock input;

a divide-by-n frequency divider having at least: an input that is coupled to the output of the oscillator circuit, and an output that is coupled to the clock input of the synchronous switch enable circuit, where n represents the number of pulse width modulation circuits in the plurality of pulse width modulation circuits; and a divide-by-F frequency divider having at least: an input that is coupled to the input of the divide-by-n frequency divider, and a plurality of outputs, wherein each of the plurality of outputs is coupled to the clock input of a separate corresponding one the plurality of pulse width modulation circuits such that each of the plurality of pulse width modulation circuits is coupled to a corresponding output of the plurality of outputs of the divide-by-F frequency divider, each of the plurality of pulse modulation circuits is arranged to provide the corresponding pulse modulation output signal such that the pulse modulation output signal has a first frequency, the first frequency is equal to the frequency of signals received at the clock input of each of the plurality of pulse width modulation circuits, the synchronous switch enable circuit is arranged to provide the synchronous switch enable signal such that the synchronous switch enable signal has a second frequency, the second frequency is equal to the frequency of the signal received at the clock input of the synchronous switch enable circuit, F is an integer, and wherein F and n are relatively prime.

12. The circuit of claim 11, wherein F=n+1.

13. The circuit of claim 11, wherein the synchronous switch enable circuit includes:

a slow ramp generator circuit that is arranged to provide a slow ramp signal; and another pulse width modulation circuit that is arranged to pulse width modulate the slow ramp signal to provide the synchronous switch enable signal during the partially synchronous rectification.

14. A circuit for multi-phase switching regulation, comprising:

an error amplifier that is arranged to provide an error signal that is based, in part, on a difference between a feedback signal and a reference signal, wherein the feedback signal is based, at least in part, on an output voltage;

a plurality of pulse width modulation circuits, including:
a first pulse width modulation circuit of the plurality, wherein the first pulse width modulation circuit is arranged to provide a first pulse width modulation output signal having a frequency substantially equal to a first frequency, and having a duty cycle that is modulated based on the error signal; and a second pulse width modulation circuit of the plurality, wherein the second pulse width modulation circuit is arranged to provide a second pulse width modulation output signal having a frequency substantially equal to the first frequency, and having a duty cycle that is modulated based on the error signal such that the first pulse width modulation output signal has a different phase than the first pulse width modulation output signal, wherein n is an integer that represents the number of pulse width modulation circuits in the plurality, and wherein n is greater than one; and a synchronous switch enable circuit that is arranged to provide a synchronous switch enable signal such that, during a partially synchronous rectification, the synchronous switch enable signal has a frequency substantially equal to a second frequency, and a duty cycle that gradually increases to 100% during the partially synchronous rectification, wherein the second frequency satisfies one of the following three conditions:

(1) the ratio of the second frequency to the first frequency is substantially equal to an irrational number;

(2) the ratio of the second frequency to the first frequency is rational and F and N are relatively prime, where F represents r*N, r represents FPWM/FSSEN, FPWM represents the first frequency, FSSEN represents the second frequency, F represents r*N, N represents k*n, and where k represents the smallest natural number for which F is an integer; or (3) the ratio of the second frequency to the first frequency is rational and F and N are both greater than nineteen.

15. The circuit of claim 14, wherein the plurality of pulse width modulation circuits are operable to provide the plurality of pulse width modulation output signals such that the plurality of pulse width modulation output signals have relatively uniformly distributed phase differences of TPWM/n relative to each other, where TPWM represents 1/FPWM.

16. A method for multi-phase switching regulation, comprising:

providing a plurality of inductor currents corresponding to a plurality of phases by employing a plurality of inductors, wherein for each of the plurality of inductors: the inductor current is provided based, in part, on the opening and closing of two switches coupled to the inductor, wherein one of the two switches is a synchronous switch;

providing each of the plurality of inductor currents to an output capacitor to provide an output voltage;

providing an error signal that is based, in part, on a difference between a feedback signal and a reference signal, wherein the feedback signal is based, at least in part, on the output voltage;

providing a plurality of pulse width modulation output signals, wherein each of the plurality of pulse width modulation output signals is provided by performing pulse width modulation on the error signal, each of the pulse width modulation output signal has a frequency that is substantially equal to a first frequency, and wherein the plurality of pulse width modulation output signals are provided such that the plurality of pulse width modulation output signals have relatively uniformly distributed phase differences relative to each other; and providing a synchronous switch enable signal to each of the plurality of synchronous switches such that, during a partially synchronous rectification, the synchronous switch enable signal has a duty cycle that gradually increases to 100% during the partially synchronous rectification, and a frequency substantially equal to a second frequency, wherein the second frequency is related to the first frequency such that that the current through each of the plurality of inductors relative to each other is approximately balanced during the partially synchronous rectification.

17. The method of claim 16, wherein providing the synchronous switch enable signal during the partially synchronous rectification includes gradually increasing the duty cycle of the synchronous switch enable signal such that, for three periods of a first of the plurality of pulse width modulation output signals during the partially synchronous rectification, the duty cycle increases between a first period of the first pulse width modulation output signal and a second of the three periods of the first pulse width modulation output signal, and further increases between the second of the three periods of the first pulse width modulation output signal and a third of the three periods of the first pulse width modulation output signal.

18. The method of claim 16, wherein for each of the plurality of inductors, the other of the two switches is a high-side switch, the high-side switch is opened and closed based on the logic level of the corresponding pulse width modulation output signal; and wherein the synchronous switch is controlled such that:
if the high-side switch is open and the synchronous switch enable signal is asserted
the synchronous switch is closed;
else
the synchronous switch is open.

19. The method of claim 16, further comprising:

at a startup, performing a soft-start by gradually increasing the reference signal to a final value, wherein providing the synchronous switch enable signal includes:

controlling the switching regulation such that asynchronous rectification is performed at the startup by maintaining the synchronous switch enable signal at an unasserted level, wherein the partially synchronous rectification occurs after the soft-start is complete; and after the duty cycle of the synchronous switch enable signal reaches 100%, controlling the switching regulation such that synchronous rectification is performed by maintaining the synchronous switch enable signal at an asserted level.

20. The method of claim 16, further comprising:

providing a first clock signal, wherein providing the plurality of pulse width modulation signals includes:

providing a plurality of pulse width modulation clock signals by dividing the frequency of the first clock signal by n, where n represents the number of phases employed; and providing each of the plurality of pulse width modulation signals such that each of the plurality of pulse width modulation signals has a fixed frequency that is approximately equal to the frequency of each of the plurality of pulse width modulation output signals, whereby the frequency of each of the plurality of pulse width modulation clocks signals is approximately the first frequency;

and wherein providing the synchronous switch enable signal includes:

providing another clock signal by dividing the frequency of the first clock signal by F, where F is a pre-determined integer, wherein F and n are relatively prime; and providing the synchronous switch enable signal such that the frequency of the synchronous switch enable signal is approximately equal to a frequency of said another clock signal, whereby the frequency of said another clock signal is the second frequency.

* * * * *

UNITED STATES PATENT AND TRADEMARK OFFICE
CERTIFICATE OF CORRECTION

PATENT NO. : 7,342,383 B1  
APPLICATION NO. : 11/268387  
DATED : March 11, 2008  
INVENTOR(S) : Song et al.

Page 1 of 1

It is certified that error appears in the above-identified patent and that said Letters Patent is hereby corrected as shown below:

On the Title page; Item (56), under "Other Publications", line 1, delete "Abu-Qauhouq," and insert -- Abu-Qahouq, --, therefor.

On the Title page, Item (56), under "Other Publications", line 3, delete "65035" and insert -- 95035 --, therefor.

In column 7, line 9, delete "N÷1" and insert -- N+1 --, therefor.

In column 9, lines 33-34, in claim 4, delete "rectification," and insert -- rectification; --, therefor.

In column 13, line 12, in claim 16, after "such that" delete "that".

Signed and Sealed this

Eighth Day of July, 2008

JON W. DUDAS  
*Director of the United States Patent and Trademark Office*